W. S. BROWN.

STEAM ENGINE VALVE GEAR.

APPLICATION FILED SEPT. 21, 1915.

Reissued Nov. 23, 1915.

14,014.

2 SHEETS—SHEET 1.

Inventor

William S. Brown

By Cyrus Koher

Attorney

COLUMBIA PLANOGRAPH CO., WASHINGTON, D. C.

W. S. BROWN.

STEAM ENGINE VALVE GEAR.

APPLICATION FILED SEPT. 21, 1915.

Reissued Nov. 23, 1915.

14,014.

2 SHEETS—SHEET 2.

Inventor

William S. Brown

Cyrus Kehr

Attorney

COLUMBIA PLANOGRAPH CO., WASHINGTON, D. C.

UNITED STATES PATENT OFFICE.

WILLIAM SHERMAN BROWN, OF KNOXVILLE, TENNESSEE, ASSIGNOR, BY MESNE ASSIGNMENTS, TO SOUTHERN LOCOMOTIVE VALVE GEAR COMPANY, A CORPORATION OF TENNESSEE.

STEAM-ENGINE VALVE-GEAR.

14,014. Specification of Reissued Letters Patent. Reissued Nov. 23, 1915.

Original No. 1,100,668, dated June 16, 1914, Serial No. 766,876. Application for reissue filed September 21, 1915. Serial No. 51,894.

*To all whom it may concern:*

Be it known that I, WILLIAM SHERMAN BROWN, a citizen of the United States, residing at Knoxville, in the county of Knox and State of Tennessee, have invented a new and useful Improvement in Steam-Engine Valve-Gears, of which the following is a specification, reference being had to the accompanying drawing.

My improvement relates particularly to mechanism for transmitting motion from the crank of a drive wheel of a steam locomotive to the distributing valve which admits steam to the cylinder.

The object of the improvement is to provide a construction which is simple, has the parts accessibly located, and which avoids irregularity of valve action due to lost motion or "pounding" at the crank.

This improvement is applicable to the mechanism described by my United States Patent No. 1,033,532, granted July 23, 1912, for "Steam-engine valve gear."

Figure 3:
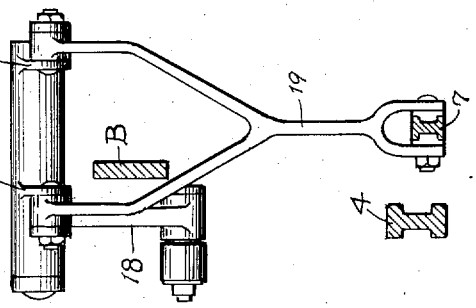
Figure 4:
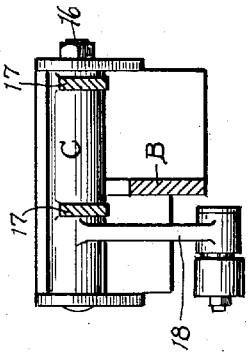
Figure 1:
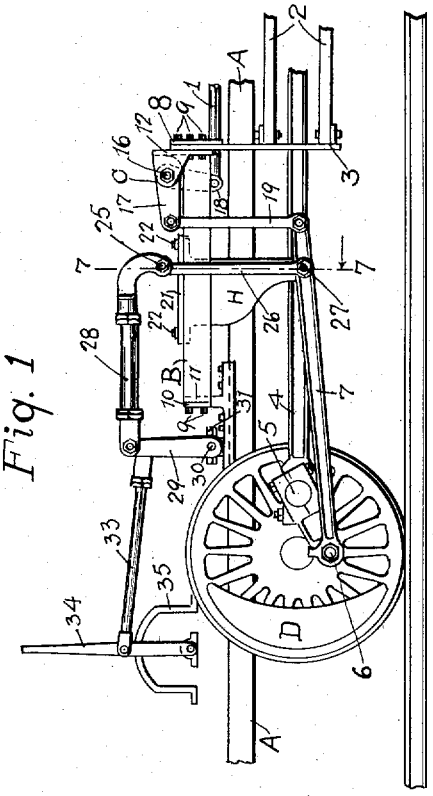
Figure 2:
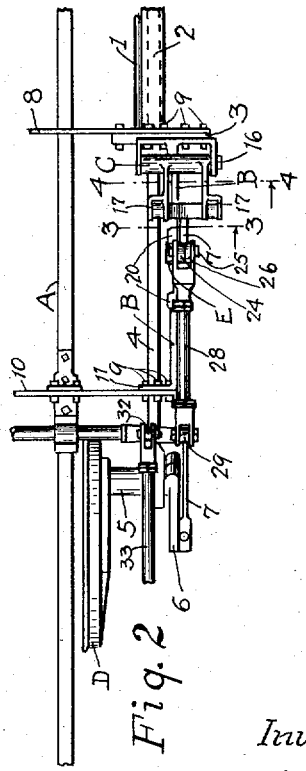
Figure 5:
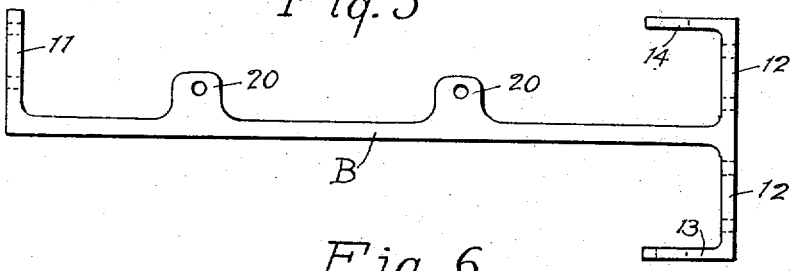
Figure 6:
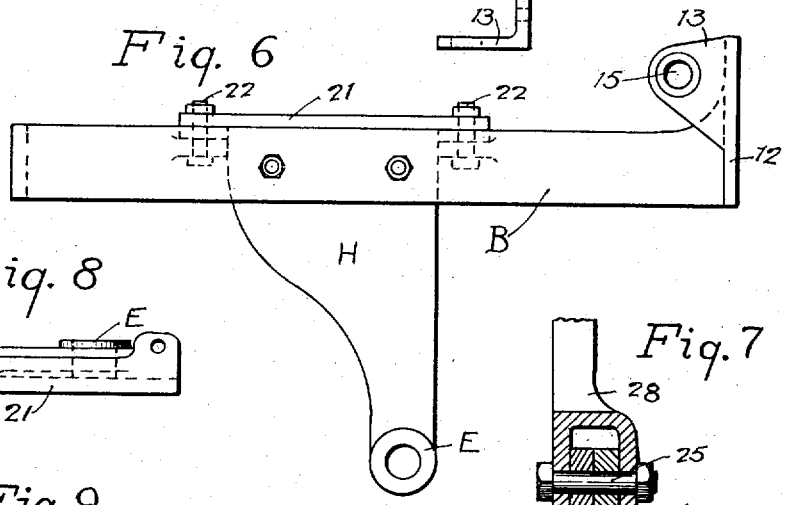
Figure 8:
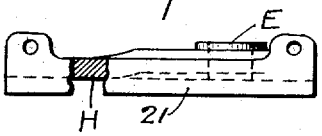
Figure 7:
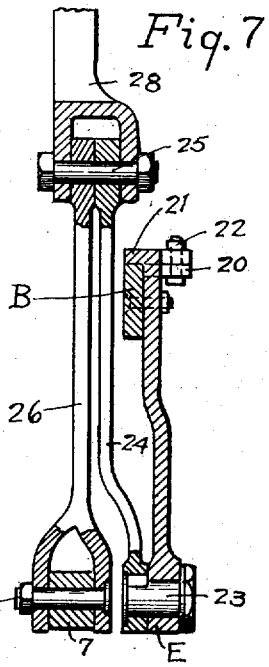
Figure 9:
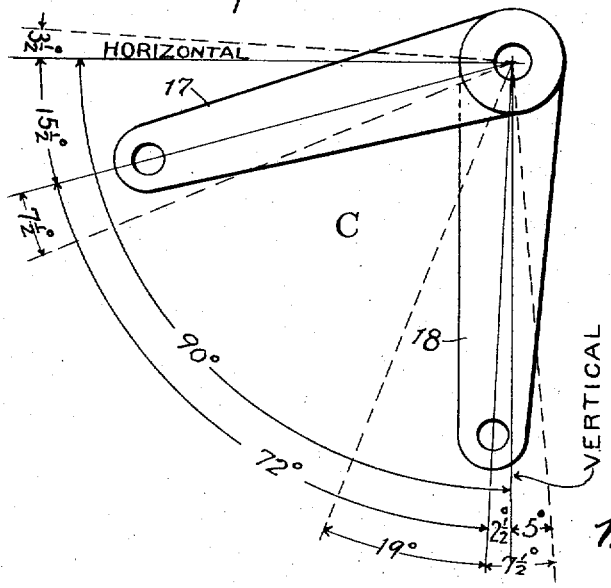

In the accompanying drawings, Figure 1 is a side elevation, portions being broken away, showing my improvement applied to one side of a locomotive; Fig. 2 is a plan of a portion of the mechanism shown by Fig. 1; Fig. 3 is a section on the line, 3—3, of Fig. 2, looking toward the right; Fig. 4 is a section on the line 4—4, of Fig. 2, looking in the direction of the arrow; Fig. 5 is a plan of the bridge upon which the segment is seated; Fig. 6 is a side elevation of said bridge; Fig. 7 is a section on the line, 7—7, of Fig. 1, looking toward the left; Fig. 8 is a plan of the hanger; Fig. 9 illustrates the position and movements of the bell crank.

Referring to said drawings, 1, is the usual valve stem extending to the distributing valve (not shown). The usual horizontal, parallel cross-head guide bars, 2, are supported at their rear ends by the guide yoke extension, 3. The usual connecting rod or pitman, 4, is coupled to the usual main crank, 5, carried by a drive wheel, D. On the main crank, 5, is rigidly mounted an auxiliary crank, 6, standing 90 degrees forward of the main crank. To said auxiliary crank is coupled one end of the auxiliary pitman rod, 7.

A bridge, B, is located above the frame, A, and extends from the ordinary guide-yoke, 8, and guide-yoke extension, 3, to the cross beam or plate, 10, and is secured to said guide-yoke and to said cross-beam by means of bolts, 9. Said bridge is in the form of a plate having its length horizontal and being turned to bring its long edges into an upright plane. At its rear end, the bridge has a lateral extension, 11, resting against the cross-beam, 10, and receiving said bolts, 9. At its forward end the bridge has a transverse extension, 12, reaching to both sides of the body of the bridge and resting against the guide yoke, 8, and the guide yoke extension, 3, and receiving said bolts, 9. The innermost of said bolts extends through the transverse extension, 12, and the guide yoke, 8, while the others of said bolts extend through the transverse extension, 12, and through the guide yoke, 8, and the guide yoke extension, 3. On the outer portion of the transverse extension, 12, and integral therewith is an ear, 13, which is directed rearward; and on the inner portion of said transverse extension is another ear, 14, also directed rearward and located horizontally opposite the ear, 13. Each of said ears has a bearing, 15, receiving the ends of a shaft, 16. On said shaft is a bell crank or rocking member, C, preferably rotatable on said shaft, the latter being held immovably in its bearings. Said bell crank has two approximately horizontal arms, 17, and a depending arm, 18. The latter arm is coupled to the valve-stem, 1. By rocking the bell crank, the valve stem is reciprocated.

An approximately upright link, 19, has its upper end coupled to the arms, 17, of the bell crank, while its lower end is coupled to the forward end of the auxiliary pitman rod, 7, both ends of said link being forked to receive said rod and said arms, as shown in the drawings. Said arms, 17, are also forked to receive the upper ends of the link, 19. On the upper edge of the bridge, B, are horizontal bosses, 20. A hanger, H, has a lateral upper flange, 21, extending across the bridge, B, and secured thereto by bolts, 22, extending through said flange and the bosses, 20, and horizontally through the hanger and the bridge. On said hanger is a bearing box E. Said box receives a short rock shaft, 23, which is horizontal and transverse to the bridge and the frame, A. On the outer end of said shaft, 23, is a rocking member or arm, 24, directed upward and having on its upper end a horizontal wrist, 25. An approximately upright link, 26, has its upper end coupled to said wrist while its lower end is coupled, by means of a bolt, 27, to the auxiliary rod between the link, 19, and the auxiliary crank, 6, at a point which is substantially in alinement with the axis of said rock shaft, 23, when the auxiliary crank is on the upper or lower quarter, the hanger, H, bringing the axis of the rock-shaft to the proper height to effect such alinement.

The forward end of the auxiliary reach rod 28, is coupled to the upper end of the rocking member or arm, 24, the forward end of the reach rod lying beside the upper end of said rocking arm and the upper end of the link, 26, and the wrist, 25, extending through said three members. The rear end of said auxiliary reach rod is coupled to the upright arm, 29, which is rigid on the reversing shaft, 30, supported in bearings, 31. On said reversing shaft is an arm, 32, to which is coupled a rod, 33, which is in turn coupled to the ordinary reversing lever, 34, working on a sector or quadrant, 35.

In operation, the rocking arm, 24, is set to bring its upper end into any desired position in its curved path (the axis of which path is the axis of the shaft, 23), this being done by means of the reversing lever. The setting of the rocking member in such position carries the upper end of the link, 26, along said curved path into the same position, and the axis of the wrist, 25, is then (and at all times) the axis of oscillation of the link, 26, during the movements of the auxiliary rod. During each reciprocation, said auxiliary pitman rod rocks bodily with the axis of the bolt, 27, as a fulcrum. This involves the rising and falling of the forward end of said auxiliary rod, and during such movement of said end of said rod, the link, 19, is forced up and down, and such movement of said link causes the rocking of the bell crank C, and the reciprocation of the valve stem, 1. The gear is reversed by throwing the reversing lever across the center in the usual manner, and the opening of the valve is varied by moving the upper end of the rocking member or arm, 24, nearer to or farther from the upright plane in which lies the axis of the rock-shaft, 23, this being accomplished by the aid of suitable notches (not shown) on the reversing lever sector. When the upper end of the rocking member or arm, 24, is on the middle of its curved path (in said upright plane), the valve motion is reduced to the extent of the "lead." The holes through which the bolts, 22, extend are larger than the diameter of said bolts, in order to allow some shifting of the hanger before tightening said bolts. In this way, horizontal adjustment of the hanger and the axis of the rocking member or arm, 24, may be made. Upward adjustment of said axis may also be made by placing any suitable filling piece or pieces between the flanges, 21, and the upper edge of the bridge.

The drawings have been copied in part from larger working drawings used in applying my improvement to a railway freight locomotive having a piston stroke of 30 inches and having a maximum valve travel of 5½ inches and a lead of three-sixteenths of an inch. The radius of the auxiliary crank, 6, (measuring from the driver axis) is 8 and ½ inches. The distance from the auxiliary crank along the auxiliary pitman rod, 7, to the axis of the bolt, 27, is 74 and 3/32 inches. From the latter point on said pitman rod to the link, 19, is 10 and 13/32 inches. The length of the link, 26, is 35 and 11/16 inches, and that, as already described, is also the length of the rocking arm, 24. The axis of the bolt, 27, is one and five-sixteenths inches below the level of the driver axis and the cylinder axis (the "working line" or "center line of motion"). The length of the link, 19, is 32 inches. The height of the axis or fulcrum of the bell crank or rocking member, C, above the level of the center line of motion is 32 and 2/8 inches. The length of the arms, 17 and 18, of the bell crank is 12 and ⅛ inches. The rocking member, C, is not a true bell crank, its angle being less than ninety degrees—72 degrees.

When the engine is in forward motion and the main crank is on the back center and the auxiliary crank on the upper quarter, the arm, 18, is 2 and ½ degrees back of a vertical line cutting the fulcrum, and the arms, 17, are 15 and ½ degrees below a horizontal line cutting the fulcrum. When the arm, 24, is set for full valve travel (5 and ½ inches), the forward travel of the arm, 18, from the position mentioned is 7 and ½ degrees and the back travel of said arm from said position is 19 degrees, and the arms, 17, travel downward and upward correspondingly. Thus the larger portion of the travel of the rocking member arms is within the 90 degree angle formed by said vertical and said horizontal lines. These relative proportions and positions of the various parts of the mechanism produce the desired quick movement of the valve during the opening and closing and also produce equalized travel of the valve over the port during the forward motion and during the backward motion.

It is to be observed that my improvement eliminates from the valve mechanism the eccentric and also all parts having a high velocity. No part of the valve mechanism is connected to the connecting rod nor the cross-head. Movement is transmitted to the valve stem from the wrist of the auxiliary crank and said wrist travels in a relatively small circle. Thus the movement of the auxiliary rod and the links, 19 and 26, are through relatively short ranges. Furthermore, it is to be noted that lost motion due to wear at the wrist of the auxiliary crank will chiefly modify the lengthwise movement of the auxiliary pitman, 7, while the movement transmitted through the link, 19, is approximately at right angles to said auxiliary pitman. Hence the modification of the longitudinal movement of said pitman is substantially not transmitted to said link. And it will be seen that such modification of the rocking movement of the auxiliary pitman due to wear at the wrist of the auxiliary crank will affect the link, 19, in minimized form, because the portion of the auxiliary pitman between the axis, 27, and the link, 19, is much less than between said axis and the wrist of the auxiliary crank. In this connection it is to be remembered that wear by the auxiliary crank wrist in the auxiliary pitman is chiefly in the direction of the length of said pitman. Such wear produces what is termed lost motion or "pounding" at the crank.

I claim as my invention:

1. In a steam engine valve gear, the combination of a rocking member, a reversing lever in operative relation with said rocking member, an auxiliary crank, an auxiliary rod having one end coupled to said crank, and approximately upright link coupled to said auxiliary rod between its ends and at a point which is substantially in alinement with the axis of said rocking member when the auxiliary crank is on the upper quarter or the lower quarter, and said link having its upper end coupled to the free portion of said rocking member, and means connecting the outer end of said auxiliary rod into operative relation with the stem of the distributing valve, substantially as described.

2. In a steam engine valve gear, the combination of a rocking member extending upward from its axis, a reversing lever in operative relation with said rocking member, an auxiliary crank, an auxiliary rod having one end coupled to said crank, an approximately upright link coupled to said auxiliary rod between its ends and at a point which is substantially in alinement with the axis of said rocking member when the auxiliary crank is on the upper quarter or the lower quarter and said link having its upper end coupled to the free portion of said rocking member, and means connecting the outer end of said auxiliary rod into operative relation with the stem of the distributing valve, substantially as described.

3. In a steam engine valve gear, the combination of a rocking member, a reversing lever in operative relation with said rocking member, an auxiliary crank, an auxiliary rod having one end coupled to said crank, an approximately upright link coupled to said auxiliary rod between its ends and at a point which is substantially in alinement with the axis of said rocking member when the auxiliary rod is on the upper quarter or the lower quarter and said link having its upper end coupled to the free portion of said rocking member, and a bell crank in operative relation with the outer end of said auxiliary rod and with the stem of the distributing valve, substantially as described.

4. In a steam engine valve gear, the combination of a rocking member extending upward from its axis, a reversing lever in operative relation with said rocking member, an auxiliary crank, an auxiliary rod having one end coupled to said crank, an approximately upright link coupled to said auxiliary rod between its ends at a point which is substantially in alinement with the axis of said rocking member when the auxiliary crank is on the upper quarter or the lower quarter and said link having its upper end coupled to the free portion of said rocking member, and a bell crank in operative relation with the forward end of said auxiliary rod and with the stem of the distributing valve, substantially as described.

5. In a steam engine valve gear, the combination of a rocking member, a reversing lever in operative relation with said rocking member, an auxiliary crank, an auxiliary rod having one end coupled to said auxiliary rod between its ends and at a point which is substantially in alinement with the axis of said rocking member when the auxiliary crank is on the upper quarter or the lower quarter, and a bell crank having its arms at an angle of less than ninety degrees, and one of said arms being in operative relation with the outer end of the auxiliary rod and the other arm being in operative relation with the stem of the distributing valve, substantially as described.

6. In a steam engine valve gear, the combination of a hanger, a rocking member supported by said hanger, a reversing lever in operative relation with said rocking member, an auxiliary crank, an auxiliary rod having one end coupled to said crank, an approximately upright link coupled to said auxiliary rod between its ends and at a point which is substantially in alinement with the axis of said rocking member when the auxiliary crank is on the upper quarter or the lower quarter, and said link having its upper end coupled to the free portion of said rocking member, and means connecting the outer end of said auxiliary rod into operative relation with the stem of the distributing valve, substantially as described.

7. In a steam engine valve gear, the combination of an adjustable hanger, a rocking member supported by said hanger, a reversing lever in operative relation with said rocking member, an auxiliary crank, an auxiliary rod having one end coupled to said crank, an approximately upright link coupled to said auxiliary rod between its ends and at a point which is substantially in alinement with the axis of said rocking member when the auxiliary crank is on the upper quarter or the lower quarter, and said link having its upper end coupled to the free portion of said rocking member, and means connecting the outer end of said auxiliary rod into operative relation with the stem of the distributing valve, substantially as described.

8. In a steam engine valve gear, the combination of a bridge supported by the main frame, a rocking member supported by said bridge, a reversing lever, in operative relation with said rocking member, an auxiliary crank, an auxiliary rod having one end coupled to said crank, an approximately upright link coupled to said auxiliary rod between its ends and at a point which is substantially in alinement with the axis of said rocking member when the auxiliary crank is on the upper quarter or the lower quarter, and said link having its upper end coupled to the free portion of said rocking member, and means connecting the outer end of said auxiliary rod into operative relation with the stem of the distributing valve, substantially as described.

9. In a steam engine valve gear, the combination of a bridge supported by the main frame, a hanger on said bridge, a rocking member supported by said hanger, a reversing lever in operative relation with said rocking member, an auxiliary crank, an auxiliary rod having one end coupled to said crank, an approximately upright link coupled to said auxiliary rod between its ends and at a point which is substantially in alinement with the axis of said rocking member when the auxiliary crank is on the upper quarter or the lower quarter, and said link having its upper end coupled to the free portion of said rocking member, and means connecting the outer end of said auxiliary rod into operative relation with the stem of the distributing valve, substantially as described.

10. In a steam engine valve gear, the combination of a bridge supported by the main frame, a hanger adjustable on said bridge, a rocking member on said hanger, a reversing lever in operative relation with said rocking member, an auxiliary crank, an auxiliary rod having one end coupled to said crank, an approximately upright link coupled to said auxiliary rod between its ends and at a point which is substantially in alinement with the axis of said rocking member when the auxiliary crank is on the upper quarter or the lower quarter, and said link having its upper end coupled to the free portion of said rocking member, and means connecting the outer end of said auxiliary rod into operative relation with the stem of the distributing valve, substantially as described.

11. In a steam engine valve gear, the combination of a hanger, a rocking member supported by said hanger, a reversing lever in operative relation with said rocking member, an auxiliary crank, an auxiliary rod having one end coupled to said auxiliary crank between its ends and at a point which is substantially in alinement with the axis of said rocking member when the auxiliary crank is on the upper quarter or the lower quarter, and said link having its upper end coupled to the free portion of said rocking member, and a bell crank in operative relation with the outer end of said auxiliary rod and with the stem of the distributing valve, substantially as described.

12. In a steam engine valve gear, the combination of an adjustable hanger, a rocking member supported by said hanger, a reversing lever in operative relation with said rocking member, an auxiliary crank, an auxiliary rod having one end coupled to said crank, an approximately upright link coupled to said auxiliary rod between its ends and at a point which is substantially in alinement with the axis of said rocking member when the auxiliary crank is on the upper quarter or the lower quarter, and said link having its upper end coupled to the free portion of said rocking member, and a bell crank in operative relation with the outer end of said auxiliary rod and with the stem of the distributing valve, substantially as described.

13. In a steam engine valve gear, the combination of a bridge supported by the main frame, a rocking member supported by said bridge, a reversing lever in operative relation with said rocking member, an auxiliary crank, an auxiliary rod having one end coupled to said crank, an approximately upright link coupled to said auxiliary rod between its ends and at a point which is substantially in alinement with the axis of said rocking member when the auxiliary crank is on the upper quarter or the lower quarter, and said link having its upper end coupled to the free portion of said rocking member, and a bell crank in operative relation with the outer end of said auxiliary rod and with the stem of the distributing valve, substantially as described.

14. In a steam engine valve gear, the combination of a bridge supported by the main frame, a hanger on said bridge, a rocking member supported by said hanger, a reversing lever in operative relation with said rocking member, an auxiliary crank, an auxiliary rod having one end coupled to said crank, an approximately upright link coupled to said auxiliary rod between its ends and at a point which is substantially in alinement with the axis of said rocking member when the auxiliary crank is on the upper quarter or the lower quarter, and said link having its upper end coupled to the free portion of said rocking member, and a bell crank in operative relation with the outer end of said auxiliary rod and with the stem of the distributing valve, substantially as described.

15. In a steam engine valve gear, the combination of a bridge supported by the main frame, a hanger adjustable on said bridge, a rocking member on said hanger, a reversing lever in operative relation with said rocking member, an auxiliary crank, an auxiliary rod having one end coupled to said crank, an approximately upright link coupled to said auxiliary rod between its ends and at a point which is substantially in alinement with the axis of said rocking member when the auxiliary crank is on the upper quarter or the lower quarter, and said link having its upper end coupled to the free portion of said rocking member, and a bell crank in operative relation with the outer end of said auxiliary rod and with the stem of the distributing valve, substantially as described.

16. In a steam engine valve gear, the combination of a bridge, a hanger having an upper flange extending across said bridge, a rocking member on said hanger, a reversing lever in operative relation with said rocking member, an auxiliary crank, an auxiliary rod having one end coupled to said crank, an approximately upright link coupled to said auxiliary rod between its ends and at a point which is substantially in alinement with the axis of said rocking member when the auxiliary crank is on the upper quarter or the lower quarter, and said link having its upper end coupled to the free portion of said rocking member, and means connecting the outer end of said auxiliary rod into operative relation with the stem of the distributing valve, substantially as described.

17. In a steam engine valve gear, the combination of a rocking member, a reversing lever, a reversing shaft in operative relation with said reversing lever and with said rocking member, an auxiliary crank, an auxiliary rod having one end coupled to said crank, an approximately upright link coupled to said auxiliary rod between its ends and at a point which is substantially in alinement with the axis of said rocking member when the auxiliary crank is on the upper quarter or the lower quarter, and said link having its upper end coupled to the free portion of said rocking member, and means connecting the outer end of said auxiliary rod into operative relation with the stem of the distributing valve, substantially as described.

18. In a steam engine valve gear, the combination of a hanger, a rocking member on said hanger, a reversing lever, a reversing shaft in operative relation with said reversing lever and with said rocking member, an auxiliary crank, an auxiliary rod having one end coupled to said crank, an approximately upright link coupled to said auxiliary rod between its ends and at a point which is substantially in alinement with the axis of said rocking member when the auxiliary crank is on the upper quarter or the lower quarter, and said link having its upper end coupled to the free portion of said rocking member, and means connecting the outer end of said auxiliary rod into operative relation with the stem of the distributing valve, substantially as described.

19. In a steam engine valve gear, the combination of a bridge supported by the main frame, a rocking member supported by said bridge, a reversing lever, a reversing shaft in operative relation with said reversing lever and with said rocking member, an auxiliary crank, an auxiliary rod having one end coupled to said crank, an approximately upright link coupled to said auxiliary rod between its ends and at a point which is substantially in alinement with the axis of said rocking member when the auxiliary crank is on the upper quarter or the lower quarter, and said link having its upper end coupled to the free portion of said rocking member, and means connecting the outer end of said auxiliary rod into operative relation with the stem of the distributing valve, substantially as described.

20. In a steam engine valve gear, the combination of a bridge supported by the main frame, a hanger adjustable on said bridge, a rocking member on said hanger, a reversing lever, a reversing shaft in operative relation with said reversing lever and with said rocking member, an auxiliary crank, an auxiliary rod having one end coupled to said crank, an approximately upright link coupled to said auxiliary rod between its ends and at a point which is substantially in alinement with the axis of said rocking member when the auxiliary crank is on the upper quarter or the lower quarter, and said link having its upper end coupled to the free portion of said rocking member, and means connecting the outer end of said auxiliary rod into operative relation with the stem of the distributing valve, substantially as described.

21. A valve gear comprising, in combination, a frame, an arm support carried thereby, a pivoted arm carried by the support, an auxiliary connecting rod, means for transmitting motion to the rod, a connection pivoted to the rod and to the arm, and means for connecting the rod to the valve for the operation thereof.

22. A valve gear comprising, in combination, a frame, an arm support carried thereby, a pivoted arm carried by the support, an auxiliary connecting rod, means for transmitting motion to the rod, a connection pivoted to the rod and to the arm, and means for connecting the rod to the valve for the operation thereof, said frame and said arm support being disposed for relative movement and provided with means for securing them in predetermined position.

23. A valve gear comprising, in combination, a frame, an arm support carried thereby, a pivoted arm carried by the support, an auxiliary connecting rod, means for transmitting motion to the rod, a connection pivoted to the rod and to the arm, and means for connecting the rod to the valve for the operation thereof, one of said frame and said arm support members being provided with an elongated aperture and the other with means engaging therewith whereby they may be secured in predetermined position.

24. A valve gear comprising, in combination, a frame, an arm support carried thereby, a pivoted arm carried by the support, an auxiliary connecting rod, means for transmitting motion to the rod, a connection pivoted to the rod and to the arm, and means for connecting the rod to the valve for the operation thereof, one of said frame and said arm support members being provided with a threaded bolt and the other with a threaded portion engaging therewith whereby the relative relation of the support and the frame may be varied.

25. A valve gear comprising, in combination, a frame, an arm support carried thereby, a pivoted arm carried by the support, an auxiliary connecting rod, means for transmitting motion to the rod, a connection pivoted to the rod and to the arm, and means for connecting the rod to the valve for the operation thereof, said frame and said arm support members being provided with means for varying their relation vertically.

26. A valve gear comprising, in combination, a frame, an arm support carried thereby, a pivoted arm carried by the support, an auxiliary connecting rod, means for transmitting motion to the rod, a connection pivoted to the rod and to the arm, and means for connecting the rod to the valve for the operation thereof, said frame and said arm support members being provided with means for varying their relation horizontally.

27. A valve gear comprising, in combination, a frame, an arm support carried thereby, a pivoted arm carried by the support, an auxiliary connecting rod, means for transmitting motion to the rod, a connection pivoted to the rod and to the arm, and means for connecting the rod to the valve for the operation thereof, said frame and said arm support means being provided with interposed means for varying their relation vertically.

28. A valve gear comprising, in combination, a pivoted arm, an auxiliary connecting rod, means for transmitting motion to the rod, a connection pivoted to the rod and to the arm, and means for connecting the rod to the valve for the operation thereof.

29. A valve gear comprising, in combination, a movable support, means in operative relation thereto for moving the support, an auxiliary rod, means for transmitting motion to the rod, a connection pivoted to the rod and forming a fulcrum therefor, and pivoted to the support, means for connecting the rod to the valve for the operation thereof, and means for varying the position of the fulcrum vertically.

30. A valve gear comprising, in combination, a movable support, means in operative relation thereto for moving the support, an auxiliary rod, means for transmitting motion to the rod, a connection pivoted to the support, means for connecting the rod to the valve for the operation thereof, and means for varying the position of the fulcrum vertically relatively to a horizontal line coincident with the axis of the means for transmitting motion.

31. A valve gear comprising, in combination, a movable support, means in operative relation thereto for moving the support, an auxiliary rod, means for transmitting motion to the rod, a connection pivoted to the rod and forming a fulcrum therefor, and pivoted to the support, means for connecting the rod to the valve for the operation thereof, and means for varying the position of the movable support vertically.

32. A valve gear comprising, in combination, a movable support, means in operative relation thereto for moving the support, an auxiliary rod, means for transmitting motion to the rod, a connection pivoted to the rod and forming a fulcrum therefor, and pivoted to the support, means for connecting the rod to the valve for the operation thereof, and means for varying the position of the movable support vertically relatively to a horizontal line coincident with the axis of the means for transmitting motion.

33. A valve gear comprising, in combination, a movable support, means in operative relation thereto for moving the support, an auxiliary rod, means for transmitting motion to the rod, a connection pivoted to the rod and forming a fulcrum therefor, and pivoted to the support, means for connecting the rod to the valve for the operation thereof, and means for varying the position of the movable support horizontally.

34. A valve gear comprising, in combination, a movable support, means in operative relation thereto for moving the support, an auxiliary rod, means for transmitting motion to the rod, a connection pivoted to the rod and forming a fulcrum therefor, and pivoted to the support, means for connecting the rod to the valve for the operation thereof, and means for varying vertically the pivot point of said support on said connection relatively to said fulcrum.

35. A valve gear, comprising, in combination, a movable support, means in operative relation thereto for moving the support, an auxiliary rod, means for transmitting motion to the rod, a connection pivoted to the rod and forming a fulcrum therefor, and pivoted to the support, means for connecting the rod to the valve for the operation thereof, and means for varying horizontally the pivot point of said support on said connection relatively to said fulcrum.

36. A valve gear comprising, in combination, a frame provided with an arm support movable relatively thereto, an upwardly disposed rocker arm pivoted in said support, means for moving the upper end of said arm, an auxiliary rod, means for transmitting motion to the rod, a fulcrum link pivoted to the rod and to the upper portion of the rocker arm, a pivoted bell crank for operating the valve, a connecting link for transmitting motion from the rod to the bell crank, and means for varying the relation of the fulcrum point of said first mentioned link relatively to the pivot point of said bell crank.

37. A valve gear comprising, in combination, a frame provided with an arm support movable relatively thereto, an upwardly disposed rocker arm pivoted in said support, means for moving the upper end of said arm, an auxiliary rod, means for transmitting motion to the rod, a fulcrum link pivoted to the rod and to the upper portion of the rocker arm, a pivoted bell crank for operating the valve, a connecting link for transmitting motion from the rod to the bell crank, and means for varying the relation of the rocking axis of said rocker arm relatively to the pivot point of said bell crank.

38. A valve gear comprising, in combination, a frame provided with an arm support movable relatively thereto, an upwardly disposed rocker arm pivoted in said support, means for moving the upper end of said arm, an auxiliary rod, means for transmitting motion to the rod, a fulcrum link pivoted to the rod and to the upper portion of the rocker arm, a pivoted bell crank for operating the valve, a connecting link for transmitting motion from the rod to the bell crank, and means for varying the relation of the pivot point of said rocker arm and fulcrum link relatively to the pivot point of said bell crank.

39. In a locomotive valve gear, the combination of a reversing mechanism comprising a support movable in an arc, a bell crank in operative relation with the distributing valve and having an angle less than ninety degrees, to wit, approximately seventy-two degrees, an auxiliary rod, means for actuating said rod, and two approximately upright links each having its lower end coupled to the auxiliary rod and one having its upper end coupled to said support and the other having its upper end coupled to the bell crank, substantially as described.

40. In a locomotive valve gear, the combination of a reversing mechanism comprising a support movable in an arc, a bell crank in operative relation with the distributing valve and having its arms standing at an angle of less than ninety degrees to each other and having their movement chiefly within a right angle formed by a vertical and a horizontal line cutting the fulcrum of said bell crank, substantially as described.

41. In a locomotive valve gear, the combination of a reversing mechanism comprising a support movable in an arc, a bell crank in operative relation with the distributing valve and having an angle less than ninety degrees, to wit, approximately seventy-two degrees, an auxiliary crank, an auxiliary rod coupled to said crank, and two approximately upright links each having its lower end coupled to the auxiliary rod and one having its upper end coupled to said support and the other having its upper end coupled to the bell crank, substantially as described.

42. In a locomotive valve gear, the combination of a reversing mechanism comprising a support movable in an arc, a bell crank in operative relation with the distributing valve and having its arms standing at an angle of less than ninety degrees to each other and having their movement chiefly within a right angle formed by a vertical line and a horizontal line cutting the fulcrum of the bell crank, an auxiliary crank, an auxiliary rod coupled to said crank, and two approximately upright links each having its lower end coupled to the auxiliary rod and one having its upper end coupled to said support and the other having its upper end coupled to the bell crank, substantially as described.

In testimony whereof I have signed my name, in presence of two witnesses, this 31st day of August, in the year one thousand nine hundred and fifteen.

WILLIAM SHERMAN BROWN.

Witnesses:

CYRUS KEHR,

LUCILE TOBLER.

Copies of this patent may be obtained for five cents each, by addressing the "Commissioner of Patents, Washington, D. C."